United States Patent
Andrews

(10) Patent No.: US 6,176,546 B1
(45) Date of Patent: Jan. 23, 2001

(54) BICYCLE SADDLE

(76) Inventor: George Edward Andrews, 456-3rd Street, Courtenay B.C. (CA), V9N 1E5

(*) Notice: Under 35 U.S.C. 154(b), the term of this patent shall be extended for 0 days.

(21) Appl. No.: 09/500,944

(22) Filed: Jan. 15, 2000

(30) Foreign Application Priority Data

Nov. 10, 1999 (CA) .................................................. 2289246

(51) Int. Cl.⁷ ...................................................... B62J 1/00
(52) U.S. Cl. ....................................... 297/195.1; 297/214
(58) Field of Search ........................... 297/195.1, 215.1, 297/202, 214, 452.21

(56) References Cited

U.S. PATENT DOCUMENTS

| | | | |
|---|---|---|---|
| 576,969 | * | 2/1897 | Hunt . |
| 602,732 | * | 4/1898 | Craig . |
| 4,218,090 | * | 8/1980 | Hoffacker et al. . |
| 4,898,422 | * | 2/1990 | West, III . |
| 5,692,801 | * | 12/1997 | Yu . |
| 5,927,802 | * | 7/1999 | Kesinger . |

FOREIGN PATENT DOCUMENTS

| | | |
|---|---|---|
| 1146460 | 5/1983 | (CA) . |
| 1230041 | 12/1987 | (CA) . |

* cited by examiner

*Primary Examiner*—Milton Nelson, Jr.
(74) *Attorney, Agent, or Firm*—Frederick Kaufman

(57) ABSTRACT

A bicycle saddle comprising a shell provided with a support portion which extends forwardly with a nose portion. The support portion has a flat, horizontal top, which is substantially trapezoidal in plan. The nose portion has also a flat, horizontal top which is elongated. The support and nose portions are situated in parallel planes. The nose portion is, with respect to the support portion, located in a lower plane and narrower. The distance between the parallel planes is so chosen that a contact between a rider's genitials and pernieum area and the nose portion is basicially prevented. The support and nose portions are intergrally formed.

5 Claims, 2 Drawing Sheets

BICYCLE SADDLE

BACKGROUND OF THE INVENTION

1. Field of the Invention

The present invention relates generally to the field of cycle saddles and, in particular, to a bicycle saddle.

2. Description of the Related Art

In general, bicycle saddles are uncomfortable, especially when used for continuous, long rides.

Two basic causes of bicycle saddles discomfort are chaffing of rider's skin and road impacts, transmitted through the saddle, which produce pain in the pelvic region.

Numerous attempts have been made in the past to eliminate or, at least, alleviate the above mentioned causes of discomfort. Several U.S. Patents have addressed these issues. For example, U.S. Pat. No. 5,873,626, dated Feb. 23, 1999 and granted to Katz for a "Bicycle Seat", discloses a seat comprising a frame to be sat on by a user. The frame includes two side portions for supporting the ischial tuberosities and for avoiding the application of pressure to the perineal zone. Each of side portions includes a hollow loop portion for displacing the pressure. The frame further includes a portion, at rear of the seat, connecting the side portions. In its seat configuration Katz's structure has two basis shortcomings. First, the described Katz's seat does not constitute a real support. There is no flat portion to bear the rider's weight.

Second, the side portions being narrow, the specific pressure by the rider's weight is high, causing discomfort and pain.

U.S. Pat. No. 5,765,912, dated Jun. 16, 1998 and granted to Bontrager for a "Bicycle Saddle having resilient forward nose", discloses an off-road bicycle having a saddle comprising a shell with a relatively narrow nose. A resilient pad is placed underneath the nose, between the shell and a rail, the latter being attached to the front and rear parts of the shell. The main disadvantage of Bontrager's saddle resides in the fact that regardless of the use of a resilient pad, the application of pressure to the rider's perineal zone is not avoided.

U.S. Pat. No. 5,720,518, dated Feb. 24, 1998 and granted to Harrison for a "Universal bike and exercycle seat cushion accessory" discloses a seat cushion that is placed on top of conventional bike seats. The seat cushion comprises two separate cushioning features, whose surface area is smaller than the conventional bike seat upon which they are positioned. The two seperate cushioning features allow unlimited placement adjustment options. There are two disadvantages to this seat. First, the height of the cushioning features being relatively small, no effective depression if formed, and thus, the application of pressure to the rider's perineal zone is not avoided. Second, the horn of the seat is too wide, which causes chaffing of the rider's skin.

U.S. Pat. No. 4,613,187, dated Sep. 23, 1986 and granted to Gordon for "Bicycle and Stationary Seats" discloses a seat comprising a multilayered cylindrical seat bar. The latter is mounted to the bicycle in a direction substantially transverse to the frame of the bicycle, so the seat bar abutts against and spans the entire width of the rider's buttocks. Although this seat does not contact the crotch of the rider, it is definitely uncomfortable due to its limited and rounded supporting surface. Furthermore, the lack of a nose makes the centering difficult.

U.K. Patent Application No. 2,332,655, dated Dec. 23, 1997 and granted to Swaffer for "A bicycle seat with two halves, each rotable about an axis" comprises a seat including left and right buttock-supporting parts. Each part is mounted to turn, independently of the other, about an axis. This seat is believed to have two disadvantages. First, like in the previous disclosed seat, no flat supporting surface is provided, thus it is uncomfortable for riding. Second, the alternative movements of left and right-buttock supporting parts causes an alternation of rider's center of gravity, which is tiresome, especially in long ridings.

International P.C.T. Applicaation WO 98/25810, filed Dec. 2, 1997 by Nelson for a "Bicycle Seat" discloses a bicycle seat having two buttock support portions, separated by a slot. The seat has a nose portion and the transition between the support portions and the nose portion forms hinges for allowing the support portions to move independently. The seats disclosed in this application have two essential disadvantages. First, the supporting portions are not flat which is uncomfortable. Second, the seat, being inclined with respect to a horizontal plane, produces a movement of a rider's center of gravity towards the nose portion. Thereby, a contact between the rider's crotch and the nose portion is not only not avoided, but enhanced.

The inventor believes that the cited disclosures taken alone or in combination neither anticipate nor render obvious the present invention. The foregoing citation does not constitute an admission that such disclosures are relevant or material to the claims. Rather, the disclosures relate only to the field of the invention and are presented as constituting the closest art of which the inventor is aware.

SUMMARY OF THE INVENTION

There is accordingly a need for a bicycle saddle which overcomes the disadvantages of the prior art.

It is the primary objective of the present invention to provide a bicycle saddle which offers a high degree of comfort.

It is another objective of the present invention to design a structure which is easy to manufacture.

It is yet another objective of the present invention to develop a saddle with a flat, horizontal supporting portion, which reproduces the normal sitting conditions.

Broadly stating, the bicycle seat, conform the present invention, comprises a shell provided with a support portion which extends forwardly with a nose portion. The support portion has a flat, horizontal top, which is substantially trapezoidal in plane. The nose portion has a flat, horizontal top, which is elongated. The support and nose portion are situated in parallel planes. The nose portion is, with respect to the support portion, located in a lower plane and narrower. The distance between the parallel planes is so chosen to prevent a contact between rider's genitals and perineum zone and the nose portion. The support and nose portions are integrally formed.

In one aspect, the invention comprises a transition portion integrally formed with the support and nose portions. The transition portion is perpendicularly disposed with respect to the support and nose portions.

In another aspect, the invention comprises two suspending rails, attached underside the shell.

In yet another aspect, the invention is provided with two connection protuberances which project from the underside of the shell, close to the back extremity of the latter, where they are laterally spaced. An extended connection protuberance projects from the underside of the nose portion, close to its front extremity.

In another aspect, the shell is provided with a pendent portion, downwardly extending from around a curved edge of the shell.

In yet another aspect, the saddle comprises a padding, superposed on the flat horizontal top of the support portion.

In a further aspect, the saddle is provided with a cover placed over the padding and the flat, horizontal top of the nose portion.

DESCRIPTION OF A PERFERRED EMBODIMENT

As required, a detailed embodiment of the present invention is disclosed herein; however, it is to be understood that the disclosed embodiment is merely exemplary of the invention which may be embodied in various forms. Therefore, specific structural and functional details disclosed herein are not to to be interpreted as limiting, but merely as a basis for the claims and as a representative basis for teaching one skilled in the art to variously employ the present invention in virtually any appropriate detailed structure.

Figure 1:
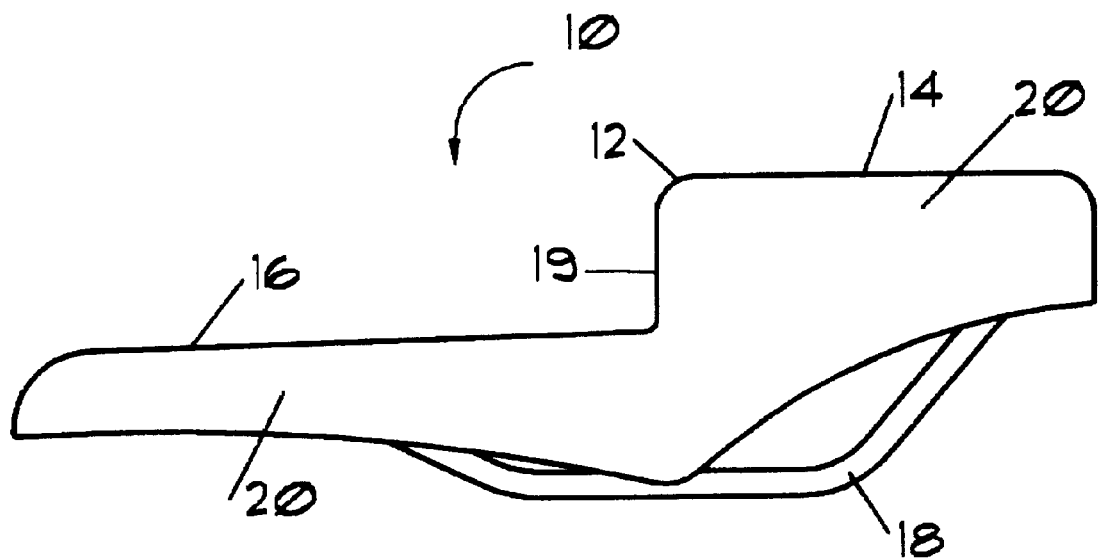
FIG. 1 shows a side view of the bicycle saddle.
Figure 2:
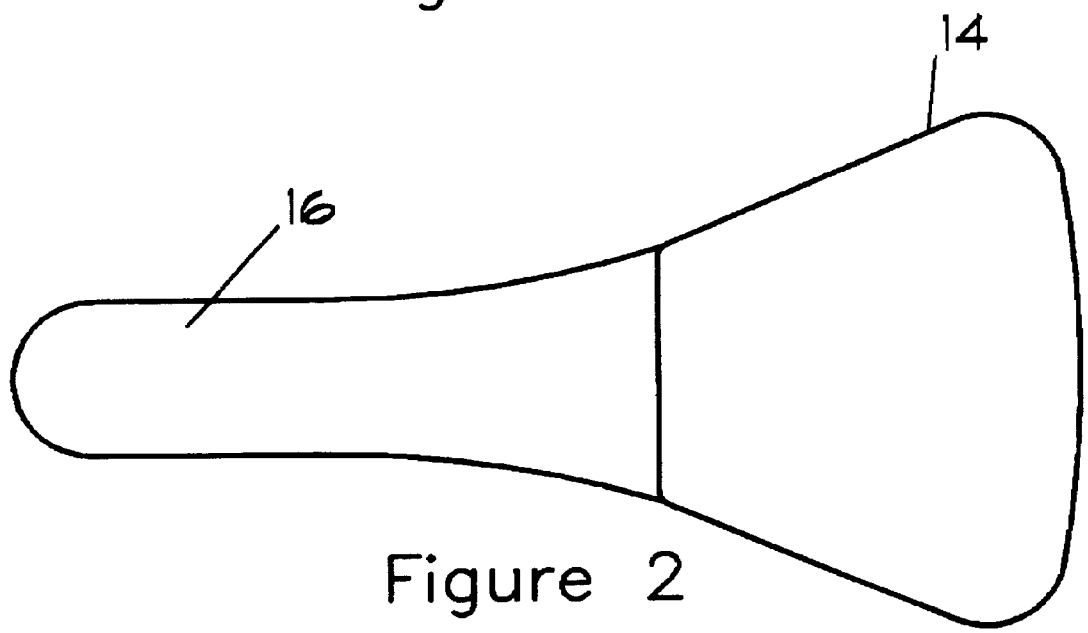
FIG. 2 shows a plan view of the bicycle saddle.
Figure 3:
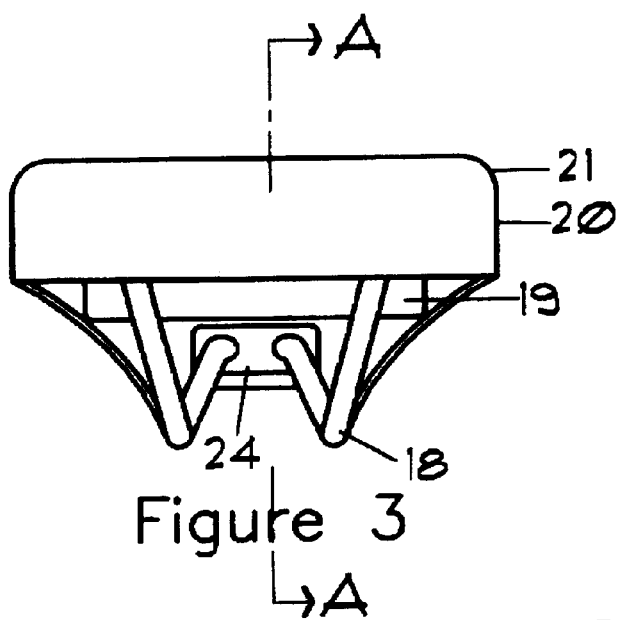
FIG. 3 shows a rear view of the bicycle saddle.
Figure 4:
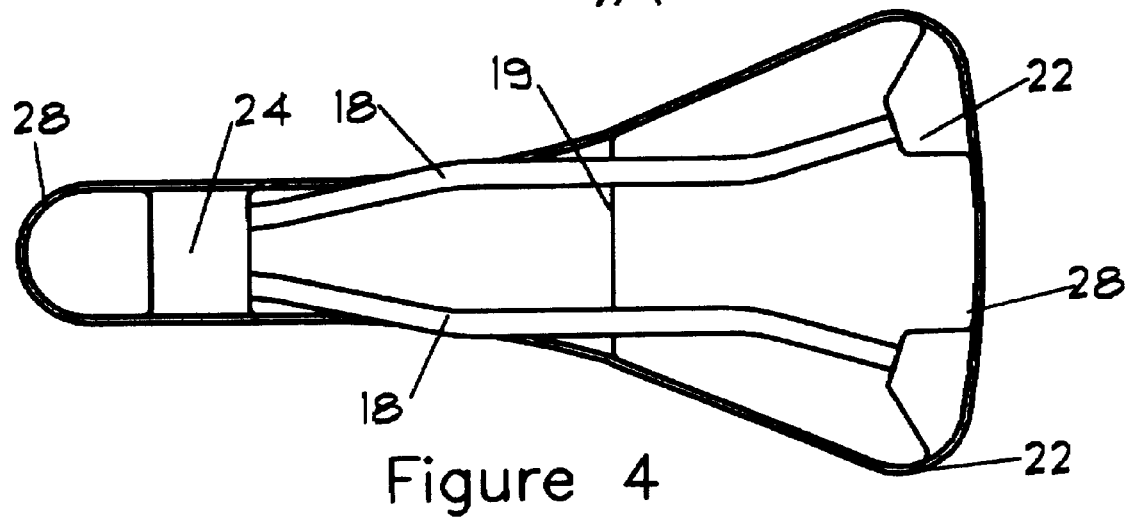
FIG. 4 shows a bottom view of bicycle saddle.
Figure 5:
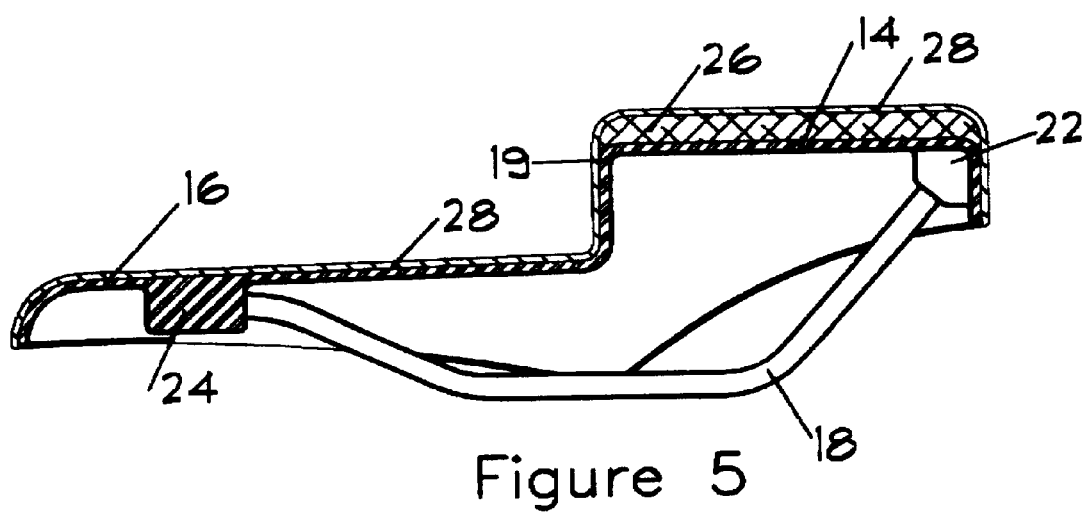
FIG. 5 shows a sectional view taken along line A-A of FIG. 3.

Referring now to FIGS. 1 to 5, wherein like components are designated by the same reference numerals, a saddle 10 comprises a shell 12, provided with a support portion 14 which extends forwardly with a nose portion 16. Two suspending rails 18, attached underside shell 12, are used to connect the latter to a saddle post (not shown). Shell 12 is made from rigid plastic material, usually by molding, and has a flat, horizontal top, substantially trapezoidal in plane, which corresponds to support portion 14. Nose portion 16 has an elongated form and a flat, horizontal top. The flat horizontal tops of support portion 14 and nose portion 16 are situated in parallel planes. The latter portion is, with respect to the former portion, located in a lower plane and has a relatively narrow top surface.

A transition portion 19, integrally formed with both support portion 14 and nose portion 16, is perpendicularly disposed with respect to the former and latter portions.

A pendent portion or rim 20 extends downwardly from around a curved edge 21 of shell 12.

Two connection protuberances 22 project from the underside of supporting portion 14, close to its back extremity, and are laterally spaced. An extended connection protuberance 24 projects from the underside of the nose portion 16, close to its front extremity.

The ends of suspending rails 18 are permanently embedded into shell 12, respectively into two connection protuberances 22 and extended connection protuberance 24.

A padding 26 is superposed on the flat, horizontal top of support portion 14, while a cover Z8 is placed over padding 26 and flat, horizontal top of nose portion 16.

The distance between the flat, horizontal top of support portion 14 and the flat, horizontal top of nose portion 16 is so chosen, that the application of any pressure to the perenial body and the perineal structures of the rider is basically avoided. Thereby, any contact of rider's genitals and perineal area and flat, horizontal top of nose portion 16 is prevented.

Support portion 14 of shell 12 is used for accomodating riders's buttocks, while nose portion 16 is used to assist the rider in maintaining alignment with the bicycle, during mounting and dismounting, or pedaling in a standing position.

What is claimed is:

1. A bicycle saddle, adapted to accomodate a rider's genitals, comprising, in combination, a shell provided with a support portion which extends forward to a nose portion, said support and nose portions being integrally formed, said support portion having a flat, horizontal top which is substantially trapezoidal in plane, while said nose portion has a flat, horizontal top which is elongated and narrower than said support portion, said support and nose portions being situated at a distance, in parallel planes, whereby, due to the relative position between said support and nose portions, with said nose portion located forward of and lower than said support portion, thus, a space adapted to accomodate said rider's genitals is formed.

2. A bicycle saddle, as defined in claim 1, further comprising a transition portion integrally formed with said support and nose portions, said transition portion being perpendicularly disposed with respect to said support and and nose portions, and joining the forward end of said support portion with the back of said nose portion.

3. A bicycle saddle, as defined in claim 1 or 2, further comprising a pair of suspending rails attached to the bottom of said shell, said bottom being therefore provided, close to its back extremity, with a pair of laterally spaced connection protuberances, and close to its front extremity, with an extended connection protuberance.

4. A bicycle saddle, as defined in claim 1 or 2, further comprising a pendant portion downwardly extending from around a curved edge of said shell.

5. A bicycle saddle, as defined in claim 1 or 2, further comprising a padding superposed on said flat, horizontal top of said support portion.

* * * * *